US008468043B2

(12) United States Patent
Resende et al.

(10) Patent No.: US 8,468,043 B2
(45) Date of Patent: Jun. 18, 2013

(54) NETWORKS WITH REDUNDANT POINTS OF PRESENCE USING APPROXIMATION METHODS AND SYSTEMS

(75) Inventors: Mauricio Guilherme de Carvalho Resende, Holmdel, NJ (US); Celso Carneiro Ribeiro, Rio de Janeiro (BR); Luciana de Souza Pessôa, Niterói (BR)

(73) Assignee: AT&T Intellectual Property I, L.P., Atlanta, GA (US)

( * ) Notice: Subject to any disclaimer, the term of this patent is extended or adjusted under 35 U.S.C. 154(b) by 497 days.

(21) Appl. No.: 12/386,046

(22) Filed: Apr. 13, 2009

(65) Prior Publication Data
US 2010/0261481 A1 Oct. 14, 2010

(51) Int. Cl.
*G06Q 10/00* (2012.01)
(52) U.S. Cl.
USPC .......................................................... 705/7.11
(58) Field of Classification Search
USPC .......................................................... 705/7.11
See application file for complete search history.

(56) References Cited

U.S. PATENT DOCUMENTS

| | | | | | |
|---|---|---|---|---|---|
| 5,343,388 | A | * | 8/1994 | Wedelin ........................ | 705/7.13 |
| 5,504,887 | A | * | 4/1996 | Malhotra et al. ........................ | 1/1 |
| 5,546,542 | A | * | 8/1996 | Cosares et al. ................ | 709/241 |
| 5,940,816 | A | * | 8/1999 | Fuhrer et al. ..................... | 706/13 |
| 6,092,065 | A | * | 7/2000 | Floratos et al. ................ | 707/737 |
| 7,752,064 | B2 | * | 7/2010 | Kauffman ..................... | 705/7.26 |
| 2002/0188489 | A1 | * | 12/2002 | Cheng et al. ........................ | 705/8 |
| 2003/0014379 | A1 | * | 1/2003 | Saias et al. ...................... | 706/45 |
| 2003/0099014 | A1 | * | 5/2003 | Egner et al. ................... | 359/124 |

OTHER PUBLICATIONS

Metaheuristic hybridization with GRASP[PDF] from psu.edu MGC Resende—TutORials in Operations Research, Inst. for Mgmt Sci. . . . , 2008—Citeseer.*
"Path relinking, cycle-based neighbourhoods and capacitated multicommodity network design", [PDF] from umontreal.ca I Ghamlouche, TG Crainic . . . —Annals of Operations research, 2004—Springer.*
A Lagrangian heuristic based branch-and-bound approach for the capacitated network design problem [PDF] from jstor.org K Holmberg . . . —Operations Research, 2000—JSTOR.*
A Scatter Search Heuristic for the Fixed-Charge Capacitated Network Design Problem TG Crainic . . . —Metaheuristics, 2007—Springer.*
The p-median problem: A survey of metaheuristic approaches[PDF] from psu.eduN Mladenovic, J Brimberg, P Hansen . . . —European Journal of . . . , 2007—Elsevier.*
A template for scatter search and path relinking[PDF] from psu.edu F Glover—Artificial evolution, 1998—Springer.*
Evolutionary Algorithms for Solving Multi-Objective Problems, Genetic and Evolutionary Computation, RB Fuller, 2007, 547-621, DOI: 10.1007/978-0-387-36797-2_10.*
J. E. Beasley, A Lagrangian Heuristic for Set-Covering Problems, Naval Research Logistics, 37(1):151-164, 1990.
J.E. Beasley, An Algorithm for Set-Covering Problem, European Journal of Operational Research, 31:85-93, 1987.

(Continued)

*Primary Examiner* — Jonathan G Sterrett

(57) ABSTRACT

Methods, systems, and products determine minimum cost networks. A k-fold coverage formulation is applied to potential network elements having cost and coverage parameters. Iterative heuristics are used to find an optimal solution to the k-set coverage formulation. The approximate solutions to the k-set coverage formulation are then used to select at least some of the potential network elements for use in a minimum cost network.

16 Claims, 10 Drawing Sheets

OTHER PUBLICATIONS

J.E. Beasley, Lagrangean Relaxation, in C.R. Reeves, editor, Modern Heuristic Techniques for Combinatorial Problems, pp. 243-303, Blackwell Scientific Publications, Oxford, U.K. and Boston MA, 1993.

K. Techapichetvanich and D. Bricker, Investigation of Lagrangian Heuristics for Set Covering Problems, Department of Industrial Engineering, The University of Iowa, 1993.

* cited by examiner

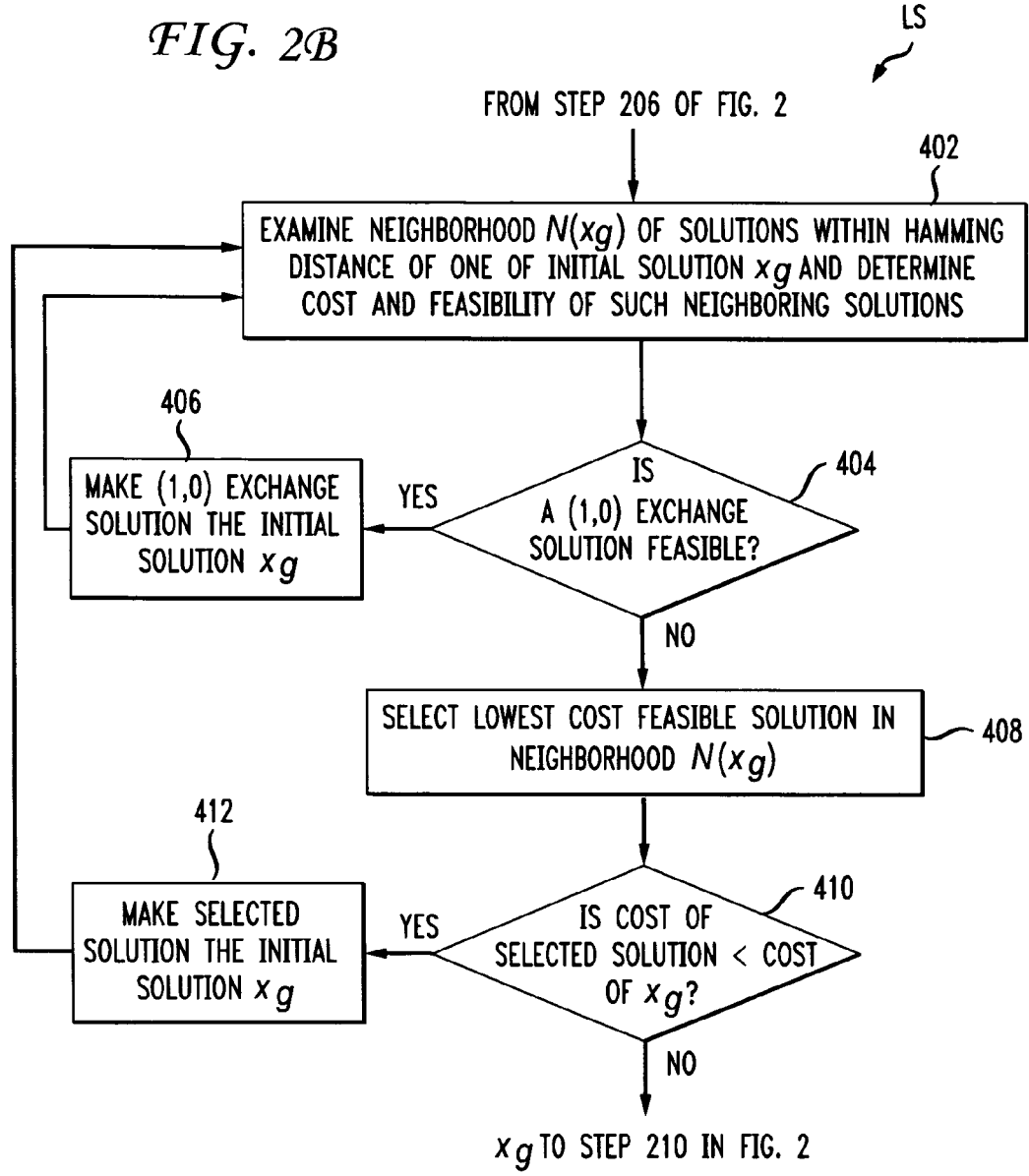

NETWORKS WITH REDUNDANT POINTS OF PRESENCE USING APPROXIMATION METHODS AND SYSTEMS

FIELD OF THE INVENTION

The present invention generally relates to network design, and more particularly to a method and system for designing minimum-cost networks, to a computer program product for performing such methods, and to networks designed according to such methods.

BACKGROUND OF THE INVENTION

The need for designing minimum-cost networks that will provide redundant coverage arises in several contexts. In telecommunications, for example, in designing cellular telephone networks it is necessary to decide where to position cellular antennas so that each customer has coverage. In order to maintain coverage in the event a particular antenna fails, it is desirable to design networks so that each customer is provided with coverage from multiple antennas. Each potential location for positioning an antenna has both an associated customer coverage and an associated cost, and it is desirable to select from potential locations those that will provide the least-cost network that will provide the desired multiple coverage.

Another example of the need for minimum-cost redundant coverage arises in the design of modem locations for telephone access by ISP users. It is highly desirable to position modems near customers so that their access costs are minimized and to provide multiple coverage so that service can continue in the event a modem fails. A least-cost network that will provide the desired multiple coverage is advantageous.

Another example of the need for minimum-cost redundant coverage arises in the placement of DSL hubs for access by subscribers. It is necessary to position the hubs within transmission range of customers and also desirable to provide multiple coverage so that service can continue in the event of failure. A least-cost network that will provide multiple coverage is advantageous.

Still another example arises in the context of computational biology, in the minimum robust tagging SNP problem. A single nucleotide polymorphism (SNP) occurs when a specific position in the DNA sequence of a population most commonly assumes two alternative values from the set {A,C,T,G} while its neighbors are unaltered. A set of SNPs in a region of DNA that tends to be inherited together is called a haplotype. The strong association between SNPs in a haplotype implies that a small subset of these SNPs, called tag SNPs, can provide enough information about the remaining SNPs in that region. Using tag SNPs for association studies can significantly reduce the cost of genotyping, since not all SNPs will have to be genotyped. Given a group of p haplotypes with n SNPs each, the minimum tagging SNP problem (MTS) consists in finding the smallest subgroup of SNPs that is able to distinguish each haplotype from the others in the group. However, it may occur that some tag SNPs are missing in one or more haplotypes. In this case, there exists a subgroup of SNPs, named robust tag SNPs, which is able to distinguish each pair of haplotypes unambiguously when at most a given number of SNPs is missing. The MTS problem thus presents the same need to find a minimum collection or network of elements that "cover" a set of objects.

Design problems of the type described above can be generalized as follows: In the K-set covering problem, we are given N sets and M objects. Each set covers one or more objects and has a cost associated with its deployment. We wish to determine the least-cost subset of sets such that each object is covered by at least K sets. Suppose we are given N potential locations where a PoP (or point of presence) can be deployed. The cost of deploying a PoP at location L is C(L). Furthermore, suppose we are given a set of M customers that require some type of service that is provided by systems in the PoP. Each potential PoP location can cover, or provide the service, to a subset of customers (usually customers that are closely located to the PoP). For a customer to be able to get service there must be at least one deployed PoP that can cover the customer. To avoid loss of service in the event of failure, we would like each customer to be covered by at least K PoPs (for example, K=2 gives minimum protection). Thus, we would like to be able to determine the least-cost subset of PoP locations such that each customer is covered by at least K PoPs.

An extremely simple example of this design problem is illustrated in FIG. 1A, which shows a set of six potential PoP locations $L_1$ through $L_6$ with respective costs $C_1$ through $C_6$, and a set of four customers $M_a$ through $M_d$ which are serviced, or covered, by the locations as follows: customer $M_a$ is covered by $L_1$, $L_3$ and $L_5$; customer $M_b$ by $L_1$, $L_2$ and $L_3$; customer $M_c$ by $L_2$, $L_3$ and $L_4$; and customer $M_d$ by $L_4$ and $L_6$. The dashed lines from each customer M to a location L indicate which locations can cover that customer. In this example, costs $C_1$, $C_3$, $C_5$ and $C_6$ are 1 unit, costs $C_2$ and $C_6$ are 2 units, and we would like dual coverage so we select K=2. We would like to determine the least-cost subset of PoP locations $L_1$ through $L_6$ such that each customer is covered by at least 2 PoPs.

FIG. 1B shows a least cost solution to the coverage design problem illustrated in FIG. 1A. As shown, locations $L_1$, $L_3$, $L_4$ and $L_6$ provide 2-fold coverage to each of the customers $M_a$ through $M_d$ with a total cost of 4 units.

One statement of the set covering problem is as follows:
Given n finite sets $P_1, P_2, \ldots, P_n$, let $c_j$ be the cost associated with set $P_j$, for $j=1, \ldots, n$. Denote sets $$I = \bigcup_{j=1}^{n} P_j = \{1, \ldots, m\}$$

and $J=\{1, \ldots, n\}$. An element of set I is called an object. A subset $\hat{J}$ of J is called a cover if $$\bigcup_{j \in J} P_j = I.$$

The cost of cover $\hat{J}$ is $\Sigma_{j \in \hat{J}} c_j$. The set covering problem is to find a cover J* of minimum cost. The set multi-covering problem is a generalization of the set covering problem where each object $i \in I$ must be covered by at least $l_i$ sets. A special case of the set multi-covering problem arises when $l_i=k$ for all $i \in I$, which is called the k-set covering problem.

It would be advantageous to be able to find solutions to the general k-set covering problem stated above to enable minimum-cost networks to be designed from potential network elements having defined costs and coverages. For small scale examples, where the number of network elements n is not great, it is possible to use brute force techniques that compare costs of all possible combinations of elements that provide the desired cover. For larger scale examples, where an optimal solution would require prohibitive amounts of computer capacity or computation time, approximation methods are necessary.

Attempts using heuristics and algorithms in approximation methods to find solutions to variants of the set covering problem appear in the prior art.

For example, a branch-and-bound algorithm to solve small instances of multicover is described by Gonsalvez et al. (D. J. GONSALVEZ, N. G. HALL, W. T. RHEE, and S. P. SIFERD, *Heuristic Solutions And Confidence Intervals For The Multi-covering Problem*, European Journal of Operational Research, 31(1):94-101, 1987).

In the computational biology field, the MSP problem was formulated as a k-set cover problem and shown to be NP-hard by Huang et al. (Y. HUANG, K. ZHANG, T. CHEN, and K. M. CHAO *Selecting Additional Tag SNPs for Tolerating Missing Data in Genotyping*, BMC Bioinformatics, 6:263-278, 2005). To find robust tag SNPs, Huang et al. proposed two greedy algorithms and a linear programming relaxation. Chang et al. developed a hybrid method that combines the ideas of the branch-and-bound method and the greedy algorithm of Huang et al. (C. J. CHANG, Y. HUANG, and K. M. CHAO, *A Greedier Approach For Finding Tag SNPs*, Bioinformatics, 22(6):685-691, 2006). Pessôa and Ribeiro proposed an algorithm based on the GRASP metaheuristic (L. S. PESSÔA and C. C. RIBEIRO, *A GRASP For The Minimum Informative Subset Problem*, In CIRRELT, editor, Proceedings of the Seventh Metaheuristics Inter-national Conference (MIC2007), pages 44-44, 2007).

GRASP is short for greedy randomized adaptive search procedure. It was introduced for a set covering problem with unit costs. (T. A. FEO and M. G. C. RESENDE, *A probabilistic heuristic for a computationally difficult set covering problem*, Operations Research Letters, vol. 8, pp. 67-71, 1989). GRASP is a multi-start metaheuristic which consists in applying local search from feasible starting solutions generated by a randomized greedy heuristic. GRASP iterations are independent, i.e. a solution generated in one iteration is not influenced by solutions found in previous iterations.

Path-relinking is a known intensification scheme that explores paths in the solution space connecting good-quality solutions (F. GLOVER, *Tabu Search and Adaptive Memory Programming—Advances, Applications and Challenges*, In R. S. Barr, R. V. Helgason, and J. L. Kennington, editors, INTERFACES IN COMPUTER SCIENCE AND OPERATIONS RESEARCH, pages 1-75. Kluwer, 1996). Laguna and Marti introduced a scheme for integrating path-relinking within a GRASP (M. LAGUNA and R. MARTI, *GRASP and Path Relinking for 2-Layer Straight Line Crossing Minimization*, INFORMS Journal on Computing, 11:44-52, 1999). Since its introduction much research has been done to enhance GRASP with path-relinking (M. G. C. RESENDE and C. C. RIBEIRO, *GRASP with Path-Relinking: Recent Advances and Applications*, In T. Ibaraki, K. Nonobe, and M. Yagiura, editors, METAHEURISTICS: PROGRESS AS REAL PROBLEM SOLVERS, pages 29-63. Springer, 2005).

Another approach which has been tried to find approximate solutions for variants of the set covering problem uses a Lagrangian relaxation heuristic (J. E. BEASLEY, *A Lagrangian Heuristic for Set-Covering Problems*, Naval Research Logistics, 37(1):151-164, 1990; J. E. BEASLEY, *An Algorithm for Set-Covering Problem*, European Journal of Operational Research, 31:85-93, 1987; J. E. BEASLEY, *Lagrangean Relaxation*, in C. R. Reeves, editor, MODERN HEURISTIC TECHNIQUES FOR COMBINATORIAL PROBLEMS, pages 243-303, Blackwell Scientific Publications, Oxford, U.K. and Boston Mass., 1993). Efforts to improve upon Beasley's Lagrangian relaxation heuristic have been presented. (K. TECHAPICHETVANICH and D. BRICKER, *Investigation of Lagrangian Heuristics for Set Covering Problems*, Department of Industrial Engineering, The University of Iowa, 1993, a copy of which is available at http://citeseer.ist.psu.edu/cache/papers/cs/25439/http: zSzzSzasrl.ecn.uiowa.eduzS zdbrickerzSzPaperszSz SCP_heuristics.pdf/techapichetvanich93investigation.pdf)

None of these prior art techniques provide minimum-cost network design methods for networks with large numbers of network elements that model the design as a k-set covering problem and are able to provide sufficiently accurate approximate solutions to the k-set covering problem in reasonable times, using reasonable amounts of computer resources.

Accordingly, it would be desirable to find methods, computer program products and computer systems using algorithms or heuristics that are operable on standard computer architectures and that are able to find good approximate solutions to network design problems where real world network element costs and coverages can be modeled as k-set cover problems in large scale instances and solutions achieved in reasonable times, using reasonable amounts of computer resources. More particularly, there is a need to provide a method and system for designing a telecommunications network by selecting the least-cost set of PoPs from a possible collection of PoPs each having an assigned cost and coverage and that will provide a desired k-coverage to customers/objects serviced by the PoPs. Networks designed by such methods have the advantage of minimal or near-minimal cost, and give their operators a cost savings that provides a competitive advantage. Having customers covered by at least k PoPs improves system availability for the customers and thus overall customer satisfaction.

BRIEF SUMMARY OF THE INVENTION

Briefly, the invention provides methods, computer program products and systems for designing minimum-cost networks from a potential collection of network elements by assigning network element parameters (such as element cost and customer or object coverage) to a formulation of the k-set covering problem, using approximation methods to find an approximate solution to the k-set covering problem, and then using the approximate solution to select one or more of the potential network elements for the minimum-cost network.

In one aspect of the invention the approximation methodology is a hybrid of a GRASP (greedy randomized adaptive search procedure) heuristic and a path-relinking heuristic.

In another aspect of the invention the approximation methodology is a hybrid of a Lagrangian heuristic and a randomized greedy heuristic, referred to in this specification as the Greedy Lagrangian Heuristic (GLH).

In still another aspect of the invention the approximation methodology is a hybrid of a Lagrangian heuristic and the GRASP heuristic, referred to in this specification as the GRASP Lagrangian Heuristic (LAGRASP).

In other aspects, the invention is a computer program product that operates one or more of the heuristic methods described above. In still other aspects, the invention is a system for designing least-cost networks using the heuristic methods of the invention. Is still another aspect, the invention is a network designed according to the methods and systems of the invention.

The methods, computer program products and systems of the present invention have several advantages. They provide minimum-cost network designs that are a subset of potential network elements having costs and coverages assigned to a model of the k-set coverage problem, and they use methodologies that find approximate solutions to the k-set coverage problem that can be performed in reasonable times and with reasonable amounts of computer resources.

The methodologies of the invention can solve instances that are much larger than those solved by other approaches. Test results suggest, among the methodologies, a tradeoff between efficiency and effectiveness. Experiments suggest that the two best heuristics in terms of accuracy are the Greedy Lagrangian Heuristic (GLH) and the GRASP Lagrangian heuristic (LAGRASP), that GLH is faster than LAGRASP, but LAGRASP finds, on average, solutions that are better than those found with GLH.

These and other objects, advantages and features of the invention are set forth in the attached description.

BRIEF DESCRIPTION OF THE DRAWINGS

The foregoing summary of the invention, as well as the following detailed description of the preferred embodiments, is better understood when read in conjunction with the accompanying drawings, which are included by way of example and not by way of limitation with regard to the claimed invention:

FIGS. 2A and 2B are flowcharts showing aspects of the GRASP algorithm as used in the network design methodology of FIG. 2.

DETAILED DESCRIPTION OF THE INVENTION

Figure 1A:
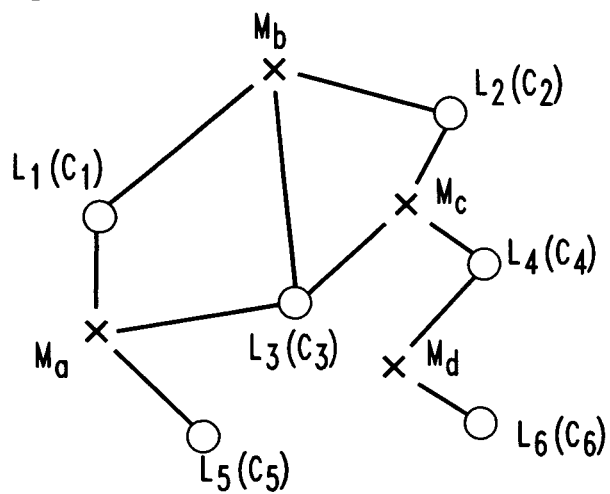
FIG. 1A is a diagram illustrating a simple example of a network design problem.
Figure 1B:
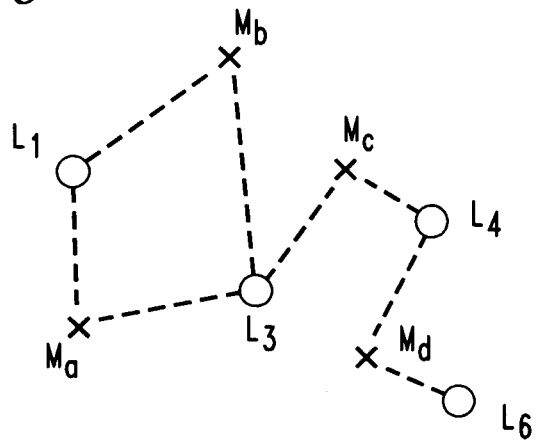
FIG. 1B is a diagram of a least-cost solution to the network design problem of FIG. 1A.

The following detailed description is directed to methods, systems, and computer-readable media for designing networks by assigning network element parameters, such as element cost and element coverage, to a formulation of the k-set coverage problem and finding approximate solutions to the k-set coverage problem by heuristic methodologies. In the following detailed description, references are made to the accompanying drawings that form a part hereof, and that show by way of illustration specific embodiments or examples. In referring to the drawings, it is to be understood that not all components described and illustrated with reference to the figures are required for all embodiments.

It should be appreciated that the logical operations described with respect to the Figures are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as process or method steps, operations, structural devices, acts, or modules. These process or method steps, operations, structural devices, acts, and modules may be implemented in software, in firmware, in special purpose digital logic, and any combination thereof. In addition, more or fewer operations may be performed than shown, and the operations may be performed in a different order than illustrated in the Figures.

Three methodologies are described in the embodiments below.

I. GRASP with Path-Relinking

An integer programming formulation of the k-set coverage problem stated above may be stated as follows. Let the m row×n column 0-1 matrix $A=[\alpha_{ij}]$ be such that $\alpha_{ij}=1$ if and only if set $P_j$ covers object $i \in I$. Then the minimum-cost Z for a collection of elements providing k coverage is:

$$Z = \min \sum_{j=1}^{n} c_j x_j \quad (1)$$

s.t.

$$\sum_{j=1}^{n} a_{ij} x_j \geq k, \quad (2)$$

$$i = 1, \ldots, m$$

$$x_j \in \{0, 1\}, \quad (3)$$
$$j = 1, \ldots, n$$

where for j=1, ..., n, $x_j=1$ if and only if j is in the cover, i.e., $j \in \hat{J}$. In other words, the vector $x_j=1$ if the set represented by column j is in the minimum-cost k-cover.

Constraint (2) ensures that each row (representing an object or a customer or group of customers) is covered by at least k columns (representing covering sets or PoPs).

As described below, a heuristic algorithm executing on a computer may be utilized to find an approximate solution to the k-set covering problem for a large set n, while requiring far less processing capacity than that needed to solve the problem exactly. Depending on the size of the set n and the number of iterations of the methodologies applied, the routine may provide an optimal or near-optimal approximation of the k-set covering problem.

Figure 2:
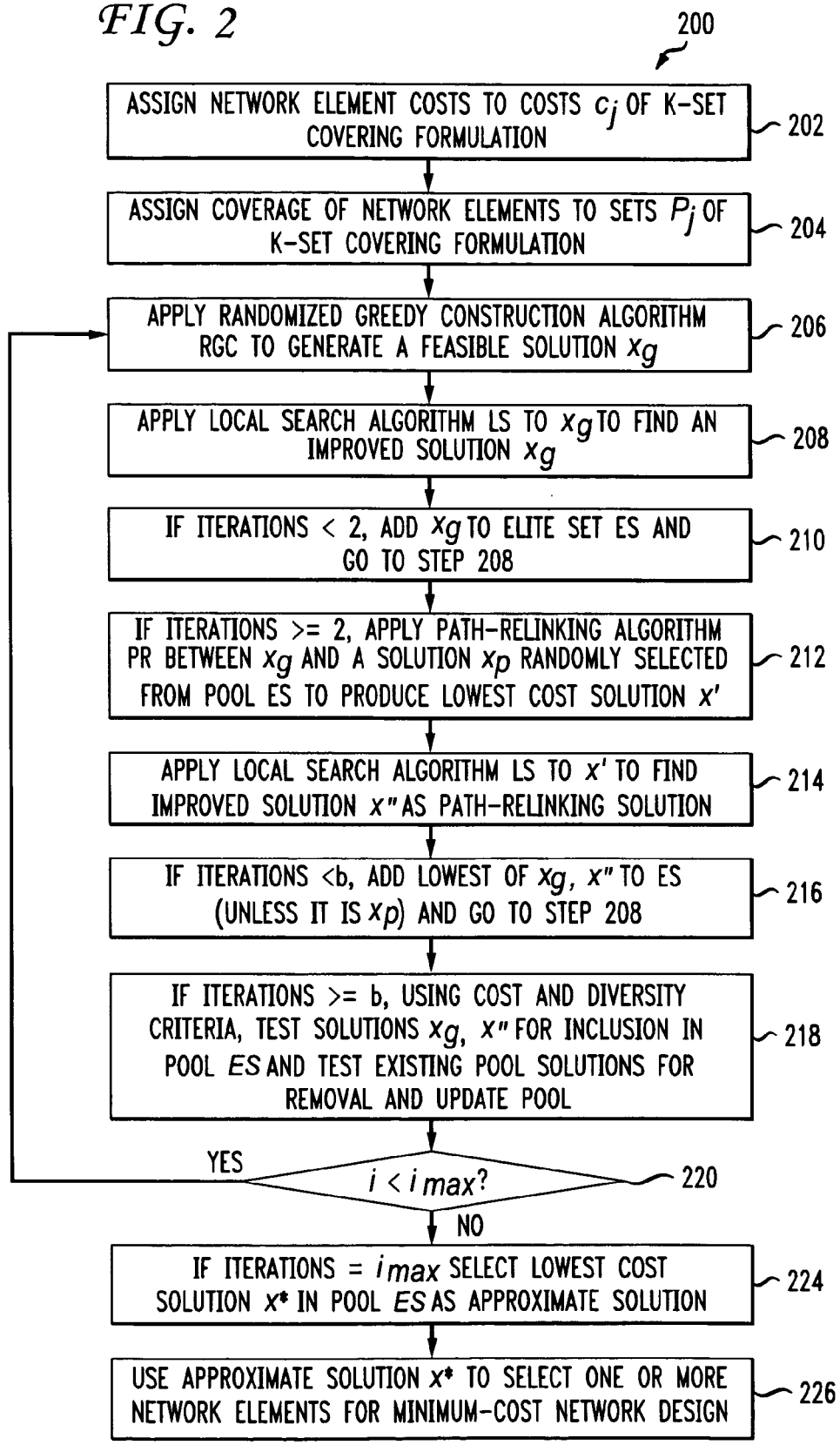
FIG. 2 is a flowchart showing a first network design methodology according to the invention.

FIG. 2 illustrates a routine or method 200 to find an approximate solution to a network design problem. At step 202, the method assigns costs of potential network elements to costs $c_j$ of the k-set covering formulation. At step 204, the method assigns coverage of potential network elements to the coverage $P_j$ parameters of the k-set covering formulation. For example, the simple network configuration of FIG. 1A would result in k being set to 2; costs C1 through C6 being set to [1,2,1,1,2,1]; and the following values being assigned to the 4×6 matrix A (where the columns are sets or PoPs at locations L1 through L6, and the rows are the customers/objects Ma through Md that are covered by the respective sets or PoPs at locations L1 through L6). A "1" indicates the customer is covered by the set or PoP at the location, a "0" indicates no coverage.

$$A = \begin{vmatrix} 1 & 0 & 1 & 0 & 1 & 0 \\ 1 & 1 & 1 & 0 & 0 & 0 \\ 0 & 1 & 1 & 1 & 0 & 0 \\ 0 & 0 & 0 & 1 & 0 & 1 \end{vmatrix}$$

The routine 200 illustrated in FIG. 2 then utilizes a hybrid of a GRASP and a path relinking methodology to approximate a solution to the k-set covering problem to which costs and coverage of potential network elements have been assigned.

GRASP (greedy randomized adaptive search procedure), as previously mentioned, is a multi-start metaheuristic. Starting from an initial feasible solution generated by a randomized greedy heuristic, local search explores its neighborhood for a less-cost solution. If none is found, the search ends returning the initial solution as a local minimum. If an improving solution is found, it is made the initial solution, and the procedure repeats itself. GRASP iterations, as described above, are independent, i.e. a solution generated in one iteration is not influenced by solutions found in previous iterations.

Path-relinking is an intensification scheme that explores paths in the solution space connecting good-quality solutions. The path N is usually defined to go from an initial solution $x_s$ to a target solution $x_t$. The solutions in the path N are $p_1(x_s, x_t)=x_s$, $p_2(x_s, x_t)$, ..., $p_\delta(x_s, x_t)=x_t$, where $\delta$ is the Hamming distance between $x_s$ and $x_t$. Solution $p_{k+1}(x_s,x_t) \in N'(p_k(x_s,x_t)) \subset N(p_k(x_s,x_t))$, where $|N'(p_k(x_s,x_t))|$ is equal to the Hamming distance between $p_k(x_s,x_t)$ and $x_t$. All solutions in $N'(p_k(x_s,x_t))$ have a Hamming distance with respect to $x_t$ that is one less than the Hamming distance between $p_k(x_s, x_t)$ and $x_t$.

A procedure for integrating path-relinking within a GRASP heuristic maintains a pool of a fixed number of elite solutions (a diverse set of good-quality solutions found during the search) and after each GRASP construction and local search, path-relinking is carried out between the GRASP local minimum and a randomly selected solution from the pool of elite solutions. Algorithm 1 below shows a template for this form of GRASP with path-relinking.

---

Algorithm 1: A basic GRASP with path-relinking heuristic for minimization.

---

Data: Number of iterations $i_{max}$
Result: Solution $x^* \in X$
P ← φ;
f ← ∞;
for i = 1, ..., $i_{max}$ do
    x ← GreedyRandomizedConstruction( );
    x ← LocalSearch( );
    if l ≥ 2 then
        Choose, at random, pool solutions $y \in P$ to relink with x;
        for y ∈ $y$ do
            Determine which (x or y) is $x_s$ and $x_t$;
            $x_p$ ← PathRelinking($x_s, x_t$);
            Update the elite set P with $x_p$;
            if $f(x_p) < f^*$ then
                $f^* ← f(x_p)$;
                $x^* ← x_p$;
            end
        end
    end
    else P ← {x};
end
$x^*$ = argmin {f(x), x ∈ P};

---

The k-set covering problem calculation method 200 applies a number b of iterations of the GRASP and path relinking methodologies to the set N of n columns of the matrix A to build an elite set ES of b feasible solutions. As is known in the art, each GRASP iteration consists of constructing a trial solution and then applying local search from the constructed solution. Thus, in FIG. 2, in step 206 a randomized greedy construction algorithm RGC is applied in the construction phase of each GRASP iteration to provide a solution $x_g$, and then in step 208 a local search algorithm LS is applied to produce an improved solution $x_g$.

Figure 2A:
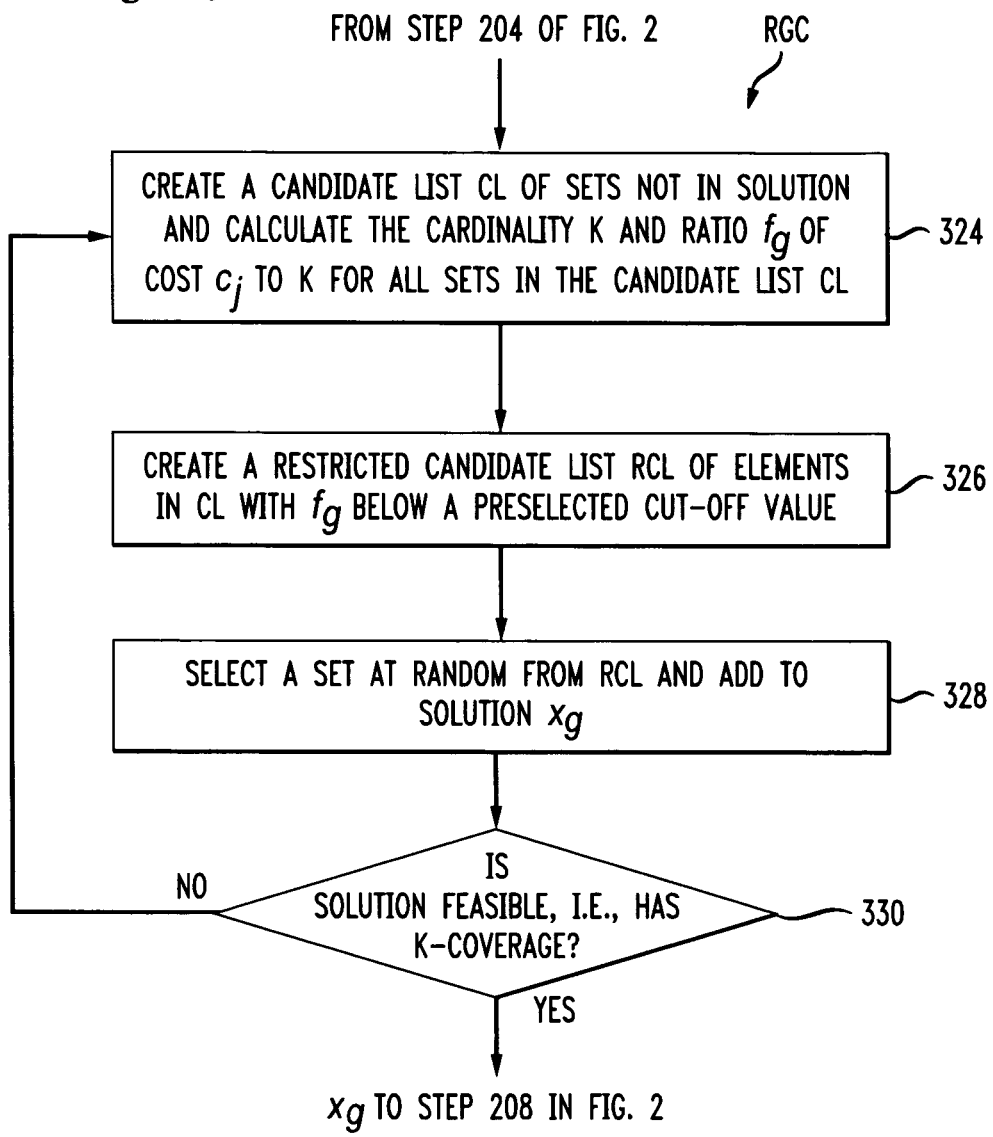

One embodiment of the greedy randomized construction algorithm RGC operates as shown in FIG. 2A.

The greedy randomized construction algorithm RGC builds a solution, adding one set at a time to the partial solution $S_{pt}$, until all objects are k-covered, i.e. are covered by at least k sets. Sets are chosen for addition to the partial solution according to the following steps. Let the cardinality K of a set be the number of objects that are not k-covered and that be can covered by the set. At each step of the construction, a partial solution is on hand. If a set is not in the partial solution $S_{pt}$, it is a candidate to be added to the partial solution and in step 324 is placed in a candidate list CL, if its cardinality K is positive. Each set $P_j$ in the candidate list CL is evaluated according to a greedy function $f_g$ defined to be the ratio of the cost $\rho_j$ of the set to its cardinality K, i.e., $f_g = \rho_j / K$. In step 324 the cardinality K and greedy function ratio $f_g$ are calculated.

In step 326 the greedy construction algorithm RGC creates a restricted candidate list RCL that is made up of candidate elements in the candidate list CL with a greedy function value $f_g$ below a specified cut-off value. A standard cut-off is defined to be $\rho^- + \alpha(\rho^+ - \rho^-)$, where $\rho^- = \min\{\rho_j | P_j \in CL\}$, $\rho^+ = \max\{\rho_j | P_j \in CL\}$, and $\alpha \in R$ such that $0 \leq \alpha \leq 1$. The value of a can be fixed or preferably is selected at random with uniform probability in the interval [0,1]. In step 328 the greedy algorithm RGC selects a set to be added to the partial solution of feasible solution $x_g$ at random from the sets in the restricted candidate list RCL. Step 330 determines if the added set makes the solution feasible, meaning all objects are k-covered, i.e. are covered by at least k sets. If not, the method returns to step 324, to repeat steps 324-328. If all objects are k-covered, the solution $x_g$ is sent to step 208, where the initial feasible solution constructed with greedy algorithm RGC has the local search algorithm LS applied to it, as described below.

Returning to FIG. 2, starting from the initial feasible solution $x_g$ generated by randomized greedy construction algorithm RGC, in step 208 a local search algorithm LS explores its neighborhood for a less-cost solution. If none is found, the search ends returning the initial solution $x_g$ as a candidate for inclusion in the elite set ES in step 210 as a local minimum. If an improving solution is found, it is made the initial solution, and the local search procedure repeats itself until no further improving solution is found, and the improved solution (or initial solution if no improved solution is found) is returned as a candidate to become part of the elite set ES in step 210.

The local search algorithm LS operates as shown in FIG. 2B. In the k-set covering problem a solution x can be represented as a binary n-vector (e.g., 01101100011...0101) of n binary digits, with a 1 in the $j^{th}$ digit representing the selection of the set $P_j$ to be in the feasible solution. The neighborhood N(x) of a solution x is the set of feasible solutions such that the Hamming distance between each of them and x is one. In step 402 of local search algorithm LS shown in FIG. 2B, each solution in neighborhood N($x_g$) within a Hamming distance of one from the initial feasible solution $x_g$ generated by greedy construction algorithm RGC is tested for feasibility (whether it provides k-coverage) and, if feasible, its cost is computed.

A cost-improving move from x to its neighbor y is a (r, s)-exchange, i.e. r components of x with value 1 are set to 0 while s components of value 0 are set to 1. A special case is the (1, 0)-exchange in which redundant sets are removed from the solution x. A (1,0) exchange to a feasible solution means a previously selected column in the solution—and it's associated cost—can be removed from the solution without violating k-coverage. Thus, in step 404 the local search algorithm LS determines if a (1,0) exchange leads to a feasible solution and, if so, in step 406 the (1,0) exchange solution is made the initial solution $x_g$ and the method returns to step 402 to explore its neighborhood. If no (1,0) exchange leads to a feasible solution, the method continues to step 408.

In step 408 the algorithm LS selects a lower cost feasible solution in the neighborhood $N(x_g)$. This may be the lowest cost feasible solution in the neighborhood $N(x_g)$ or, preferably, LS selects the first computed lower-cost solution in the neighborhood, which usually works better. Step 410 determines if the cost of the selected solution is less than the cost of the initial solution $x_g$, and if so, in step 412 the selected solution is made the initial solution $x_g$ and the method returns to step 402 to repeat steps 402-410 until no lower cost solution can be found and $x_g$ is sent to step 210 in FIG. 2.

The local search algorithm LS thus determines if there is another feasible solution within a Hamming distance of one from a trial solution, determines the cost of each such solution, and looks for a lower cost solution. If in step 410 it is determined that an improving solution is found, in step 412 it is made the initial solution, and the local search procedure LS loops back via path to step 402 and repeats steps 402-410 until no further improving solution is found.

Returning to FIG. 2, if the number of iterations is less than 2, in step 210 the local search solution $x_g$ is added to the elite set ES and the GRASP heuristic with the greedy construction RGC and local search LS features described in steps 206 and 208 above is repeated until the number of iterations i≧2 and the elite set ES is populated with two feasible solutions. At this point, a path-relinking algorithm PR is applied in step 212.

As shown in FIG. 2, the method 200 is arranged for integrating path-relinking within a GRASP algorithm. The procedure establishes and maintains a pool of a fixed number b of elite solutions ES (a diverse set of good-quality solutions found during the search and requiring the first b iterations to populate) and after each GRASP construction RGC and local search LS (steps 206 and 208), a path-relinking algorithm PR is carried out between the GRASP local minimum $x_g$ and a randomly selected solution $x_p$ from the pool ES. The number of solutions b in the pool is usually small compared to the number of GRASP/PR iterations and is determined empirically. Numbers between 10 and 100 are typical. After b iterations have populated the pool ES with b solutions, a decision process as will be described below is used to determine whether the next solution is to be added to and another solution subtracted from the pool ES.

Figure 2C:
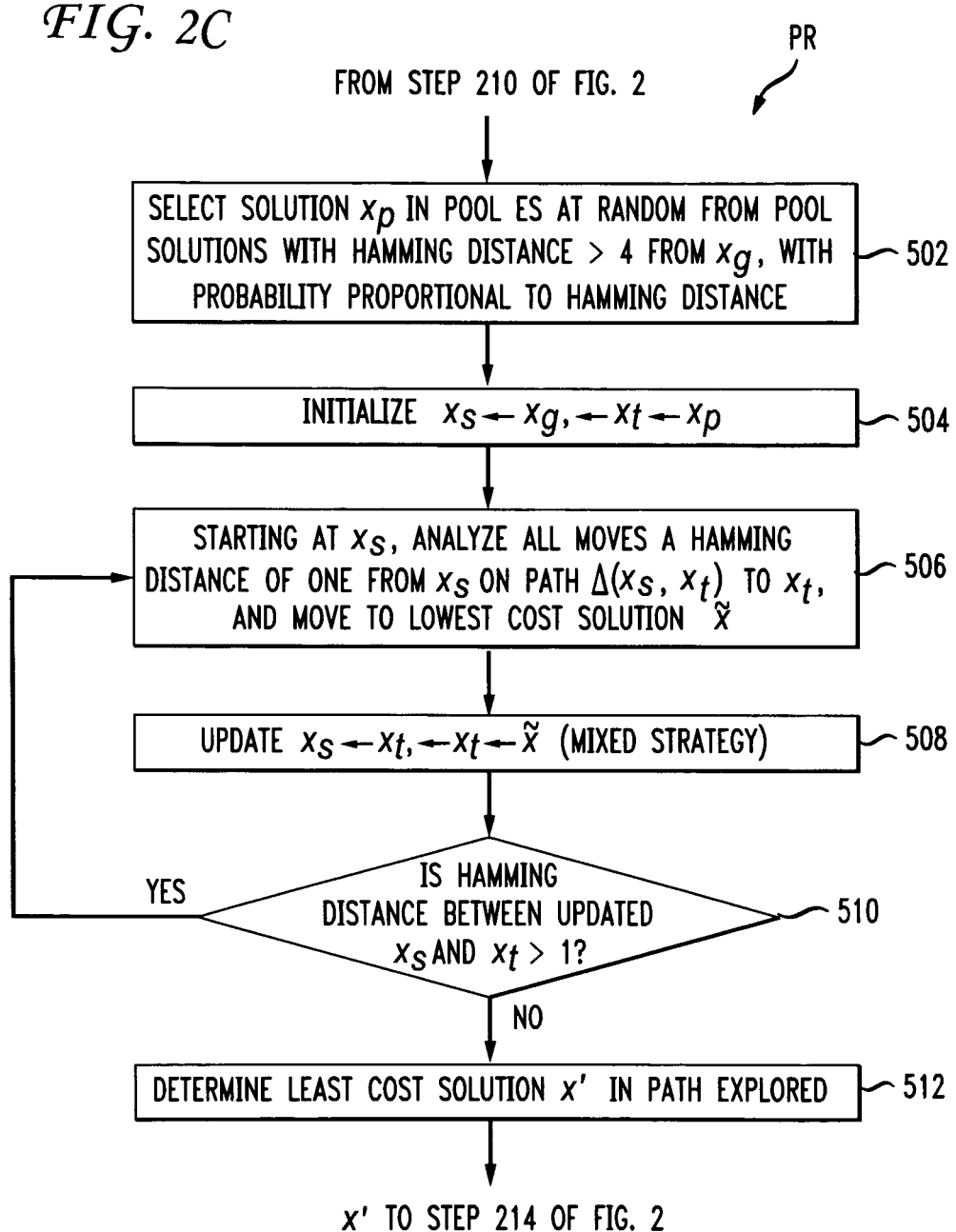
FIG. 2C is a flowchart showing aspects of the path-relinking algorithm as used in the network design methodology of FIG. 2.

The path relinking algorithm PR of step 212 operates as shown in FIG. 2C. To describe path-relinking for the k-set covering problem, let $x_g$ be the GRASP local minimum and $x_p$ be a solution in the pool ES. To favor longer paths, in step 502 of path-relinking algorithm PR the pool solution $x_p$ is chosen at random with probability proportional to the Hamming distance between the pool solution and $x_g$. We do not consider a pool solution if its Hamming distance with respect to $x_g$ is less than four since any path between such a solution and $x_g$ cannot contain lower-cost solutions. This is so because if they differ by 1, then there is no solution in the interior of the path. If they differ by 2, then there is only one solution in the interior of the path and that solution is in the local neighborhoods of both $x_g$ and $x_p$ and by definition cannot be better than either one of them. If they differ by 3, then there are 2 solutions in the interior of the path, one in the neighborhood of $x_g$ and the other in the neighborhood of $x_p$ and, again, by definition neither can be better than both $x_p$ and $x_g$. Let the symmetric difference $\Delta(x_g, x_p)$ between $x_g$ and $x_p$ be the set of moves needed to reach $x_p$ from $x_g$. A move either changes a value $x_j \leftarrow 1$ to $x_j \leftarrow 0$ or a value $x_j \leftarrow 0$ to $x_j \leftarrow 1$, for some j= 1, . . . , n. The number of moves in $\Delta(x_g, x_p)$ is equal to the Hamming distance between $x_g$ and $x_p$. Then in steps 504-510, possible solution paths between $x_g$ and $x_p$, moving a Hamming distance of one each time, are generated.

Path-relinking can be implemented in a forward direction (from $x_g$ to $x_p$), back-ward direction (from $x_p$ to $x_g$), or in a mixed direction. We experimented with all three strategies and found the mixed strategy to be the one that produced the best solutions. In one preferred version, shown in FIG. 2C, we use a mixed path-relinking scheme where the roles of initial and target solutions are interchanged after each move. This way, two paths are generated, one starting at $x_s$ and the other at $x_t$. These paths meet each other to complete a single path. Initially in our implementation, $x_s \leftarrow x_g$ and $x_t \leftarrow x_p$ and thus in step 504 we initialize $x_s \leftarrow x_g$ and $x_t \leftarrow x_p$.

In step 506, starting at $x_s$ (to be repeated at each step of the path-relinking procedure), we analyze all the moves in $\Delta(x_s, x_t)$ that are a Hamming distance of one from $x_s$, determine the lowest-cost solution, and make the move that leads to the lowest-cost solution $\tilde{x}$. There will be at least one move in $\Delta(x_s, x_t)$ that leads to a feasible solution. To see this, note that if all moves in $\Delta(x_s, x_t)$ lead to infeasible solutions, then all must be of the form $x_j \leftarrow 1$ to $x_j \leftarrow 0$. The path from any of these infeasible solutions to $x_t$ must eventually make a move of the type $x_j \leftarrow 0$ to $x_j \leftarrow 1$ to restore feasibility. This is a contradiction since we assumed that all moves in $\Delta(x_s, x_t)$ were of form $x_j \leftarrow 1$ to $x_j \leftarrow 0$.

In step 508, after the move is made to solution $\tilde{x}$ we assign $x_s \leftarrow x_t$ and $x_t \leftarrow \tilde{x}$ (to change the starting point and accomplish mixed relinking) and update $\Delta(x_s, x_t)$. In step 510 it is determined if the Hamming distance between $x_s$ and $x_t$ is greater than one, and if so, the method returns to step 506 and this alternating path-relinking process is repeated until the Hamming distance between updated $x_s$ and $x_t$ is equal to one, and then in step 512 the least-cost solution x' in the complete path explored in the path-relinking is determined, and solution x' is returned to step 214 in FIG. 2.

Returning to FIG. 2, the least-cost solution x' in the complete path explored by path-relinking algorithm PR in the path-relinking step 212 is not necessarily locally optimal. Thus, in step 214, a local search $LS_{pr}$ using the steps described above for local search algorithm LS is applied starting from x' and the resulting local optimum x" is returned as the solution of path-relinking. Note that this solution could be $x_g$ or $x_p$ in case no better path-interior solution is found. In step 216, if the number of iterations is less than b, the number of solutions with which set ES is to be populated, then the lowest-cost solution among x", $x_g$ is added to the pool of elite solutions ES. If the lowest cost solution is $x_p$, already in the pool, no addition is made.

If the number of iterations i is not less than b, then, in step 218 in FIG. 2, both the GRASP solution $x_g$ and the path-relinking solution x" are then tested for inclusion in the pool of elite solutions. Quality and diversity criteria are used for admission into the pool. The tests for admission to the pool are these: (1) If the candidate solution has better cost than any solution in pool ES, then it is automatically admitted. (2) If it has worse cost than any solution in pool ES, then it is automatically rejected. (3) Otherwise, if its Hamming distance from all pool elements is greater than four, then it is also admitted. Once a solution is admitted to the pool, it replaces an outgoing solution. The solution that is discarded from the pool is the one, among those of greater cost than the cost of the admitted solution, that is most similar to the entering solution, i.e. has the smallest Hamming distance with respect to the entering solution. In step 218, the existing pool solutions are tested for removal using this test. Solutions satisfying these tests for admission and removal are added to and removed from the pool.

The method 200 then proceeds, in step 220, to determine whether the number of iterations is less than the required number of iterations $i_{max}$; if it is, then the method returns to step 206 for an additional GRASP plus path-relinking iteration of steps 206-218; if it is not (the required number of iterations $i_{max}$ has been performed), then the method proceeds in step 224 to select the lowest cost solution x* in the elite solution pool ES as the best approximate solution. In step 226, one or more potential network elements corresponding to the best approximate solution x* are chosen for the minimum-cost network design.

II. Lagrangian Heuristics

Referring to the integer programming formulation of the k-set covering problem described in equations (1-3) above, it is known in the art that a minimization problem stated in this manner may be converted into a Lagrangian Relaxation Problem. The vector of Lagrange multipliers $\lambda \in R+^m$ associated with inequalities (2) may be used to bring these inequalities into the objective function, resulting in the Lagrangian Relaxation Problem (LRP($\lambda$)):

$$LRP(\lambda) \min \sum_{j=1}^{n} c_j x_j + \sum_{i=1}^{m} \lambda_i \left( b - \sum_{j=1}^{n} a_{ij} x_j \right)$$

s.t.

$$x_j \in \{0, 1\}, j = 1, \ldots, n.$$

By letting $$C_j = \left[ c_j - \sum_{i=1}^{m} \lambda_i a_{ij} \right],$$

LRP($\lambda$) simplifies to $$\min \sum_{j=1}^{n} C_j x_j + \sum_{i=1}^{m} \lambda_i b$$

s.t.

$$x_j \in \{0, 1\}, j = 1, \ldots, n$$

The solution of LRP($\lambda$) is a vector $X_j$ given by $$X_j = \begin{cases} 1, & \text{if } C_j \leq 0 \\ 0, & \text{otherwise} \end{cases}$$

with objective function value $$Z_\lambda = \sum_{j=1}^{n} C_j X_j + \sum_{i=1}^{m} \lambda_i b.$$

$Z_\lambda$ is a valid lower bound on the optimal solution of the original problem (1-3). The best lower bound $Z(\lambda^*)$ is the solution of the Lagrangian Dual Problem (LDP):

$$Z_d = \max_{\lambda \in R_+^m} Z_\lambda \qquad (4)$$

It is known in the art that a solution to the LDP of equation (4) may be found using a Subgradient Optimization algorithm SO. The SO algorithm starts with an initial set of Lagrange multipliers $\lambda_i$ and iteratively generates further multipliers to maximize the lower bound given by $Z_\lambda$. A well known example of such an SO is the one implemented by Beasley in the 1993 reference cited above (J. E. BEASLEY, *Lagrangean Relaxation*, in C. R. Reeves, editor, MODERN HEURISTIC TECHNIQUES FOR COMBINATORIAL PROBLEMS, pages 243-303, Blackwell Scientific Publications, Oxford, U.K. and Boston Mass., 1993).

In the SO algorithm described by Beasley, at iteration q of SO, for a feasible vector $\lambda^q$ of Lagrangian multipliers, let $X^q$ be an optimal solution to LRP($\lambda^q$), with objective function value $Z_\lambda^q$, and $\overline{Z}$ be a known upper bound on the original k-set covering problem (1-3). Additionally, let $g_q \in R^m$ be a subgradient associated with the relaxed constraints at X. Corresponding entries at iteration q for $g_q$ are $$g_i^q = (k - \alpha_i X^q), i = 1, 2, \ldots, m \qquad (5)$$

To update the Lagrangian multipliers, Beasley initially generates a step size $$T^q = \frac{\delta [\overline{Z} - Z_\lambda^q]}{\sum_{i=1,\ldots,m} (g_i^q)^2} \qquad (6)$$

where $\overline{Z}$ is a valid upper bound on Z and $\delta$ is a real number assuming values in (0,2]. The Lagrange multipliers are then updated according to $$\lambda_i^{q+1} = \max \{0; \delta_i^q - T^q g_i^q\}, i = 1, \ldots, m \qquad (7)$$

and the SO algorithm proceeds to iteration q+1. The SO algorithm stops after a maximum number of iterations $I_{max}$ is reached, after a maximum computation time $t_{max}$ is reached or after an optimal solution is found.

Beasley reports that it is computationally useful to adjust the subgradients to zero whenever they do not effectively contribute to the update of the multipliers, i.e., arbitrarily set $g_i^q = 0$ whenever $g_i^q > 0$ and $\lambda_i^q = 0$ for i=1, . . . , m. If all subgradients are set to zero, the corresponding solution is optimal and the SO algorithm may be stopped.

It is known from Beasley that the solution to LRP($\lambda_q$) that is found using the known subgradient optimization algorithm SO is usually infeasible for the original set covering problem Beasley is attempting to solve because the set coverage constraint is violated. To restore feasibility, Beasley introduced a Lagrangian heuristic to the SO algorithm and various other feasibility-restoring heuristics have been proposed as variants to Beasley's (see, e.g., the Techapichetvanich reference referred to above).

We have observed that the solution to LRP($\lambda_q$) that is found using the known subgradient optimization algorithm SO is also usually infeasible for the original k-set covering problem (1-3) that we are attempting to solve, i.e., the k-coverage constraint of equation (2) is violated. To remedy this, we introduce a basic heuristic $\mathcal{H}_B$ to convert such an infeasible solution into one that is feasible. The basic heuristic $\mathcal{H}_B$ is called in two instances: Before initializing SO, $\mathcal{H}_B$ is called once using the original cost vector $c_j$ to calculate an initial value for upper bound $\overline{Z}$. From then on, calls to $\mathcal{H}_B$ are made at each iteration q of SO. These calls convert infeasible solutions of LRP to feasible solutions S, by selecting additional sets to establish feasibility using either Lagrangian reduced costs $$C_j = c_j - \sum_{i=1}^{m} \lambda_i^q a_{ij}$$

or complementary costs given by $C_j^c = (1 - X_j^q) \cdot c_j$, for j = 1, ..., n. The objective function value $Z_\lambda^q$ of the feasible solution obtained by $\mathcal{H}_B$ using either one of the above modified cost schemes is then recomputed using the original costs $c_j$, resulting in an updated value for $\overline{Z}$, the upper bound on the optimal objective function value of the original problem (1-3). This upper bound $\overline{Z}$ may be further improved with a local search heuristic (as described above with respect to FIG. 2B, for example) and the improved upper bound $\overline{Z}$ is used to adjust the step size $T^q$ in equation (6) for the next updating of the Lagrange multipliers in the SO algorithm.

If the updated upper and lower bounds $\overline{Z}$ and $Z_\lambda^q$ are equal, then the upper bound is the value of the optimal solution to the k-set covering problem (1-3) and the SO algorithm may be stopped.

The updated upper and lower bounds $\overline{Z}$ and $Z_\lambda^q$ can further be used to attempt to price variables out of an optimal solution. If at iteration q, if $X_j = 0$ and $Z_\lambda^q + C_j > \overline{Z}$, then we can remove column j from the problem in succeeding iterations of SO because this proves that the column will not be part of any optimal solution and hence can be disregarded.

Figure 3:
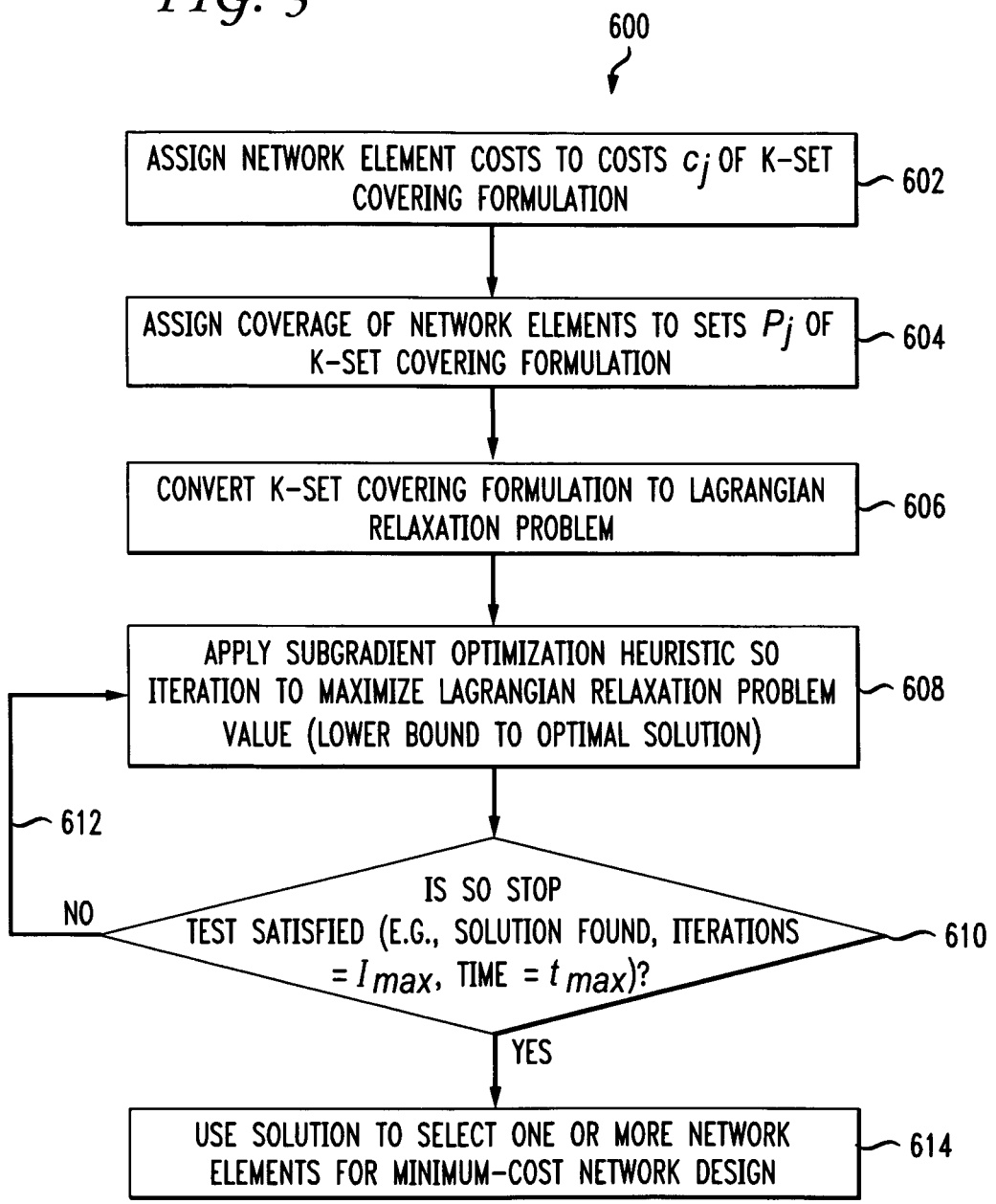
FIG. 3 is a flowchart showing a network design methodology using Lagrangian relaxation techniques.

FIG. 3 shows a method 600 for designing a minimum-cost network having k-coverage from potential network elements each having a defined cost and coverage using a Lagrangian relaxation solved with a standard Lagrangian subgradient optimization algorithm SO as described above. In FIG. 3, in step 602, the method 600 assigns costs of potential network elements to costs $c_j$ of the k-set covering formulation. At step 604, the method assigns coverage of potential network elements to the coverage $P_j$ variables of the k-set covering formulation. In step 606 the k-set covering formulation is converted to a Lagrangian relaxation problem, and in step 608 a subgradient optimization algorithm SO is applied to find an optimal solution to the Lagrangian relaxation problem LRP ($\lambda_q$). In step 610, the method 600 determines whether to stop the SO algorithm because a stopping test has been satisfied (a solution has been found, or a preselected number of iterations has been reached or a preselected amount of computation time has been consumed) and if not, the method returns via path 612 to perform another iteration of the subgradient optimization heuristic in step 608. If a stopping condition has been reached, the approximate (or optimal) solution found to the k-set covering problem (1-3) by the subgradient optimization heuristic is used in step 614 to select one or more network elements for the minimum cost network design.

Figure 4:
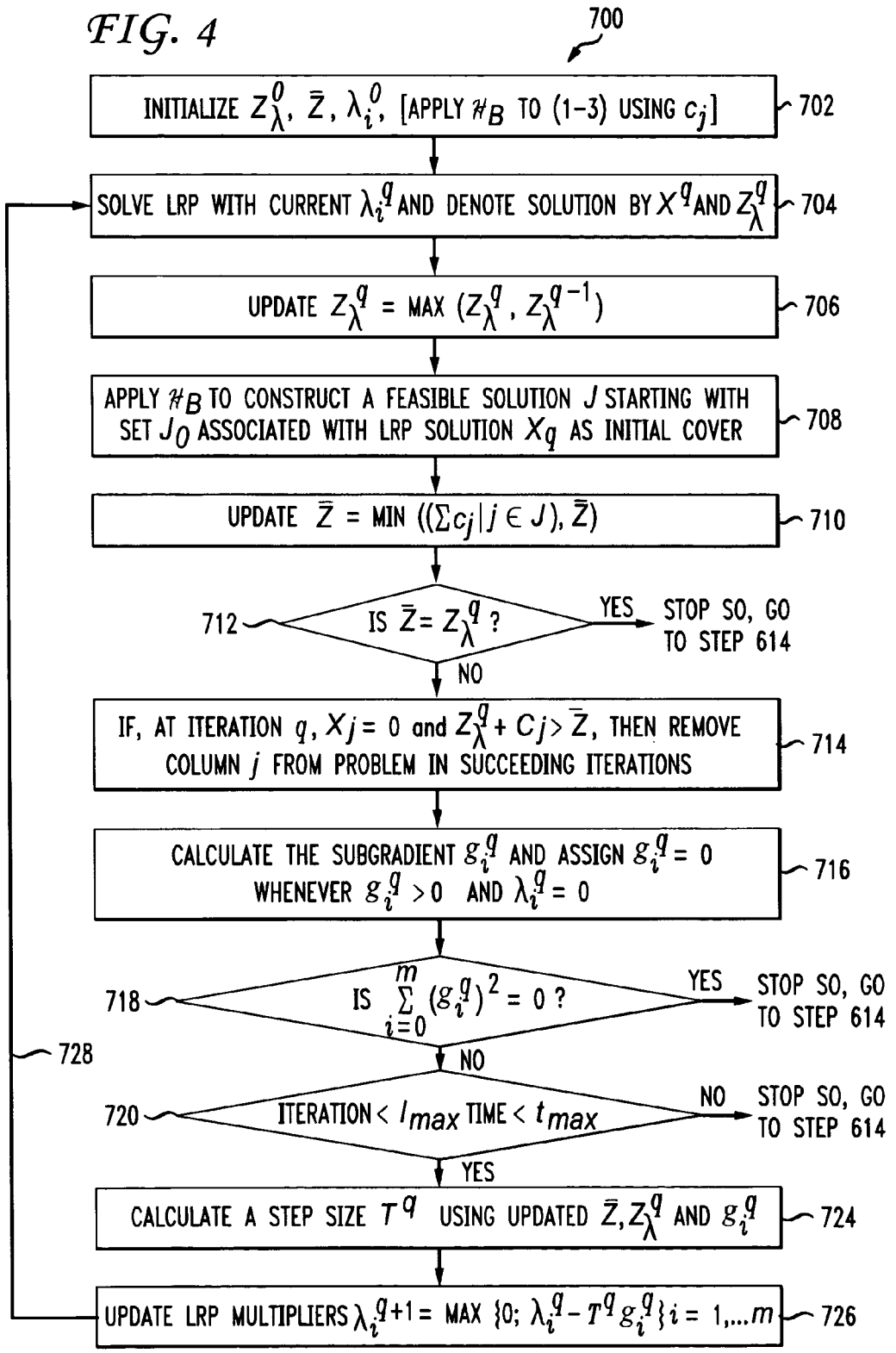
FIG. 4 is a flowchart showing a subgradient optimization algorithm used to solve Lagrangian relaxation problems.

FIG. 4 shows the method 700 employed by the subgradient optimization algorithm SO applied in step 608 of FIG. 3. As shown in FIG. 4, the SO algorithm is initialized in step 702 by setting a known upper bound $\overline{Z}$ for the k-set covering formulation, an initial value $Z_\lambda^0$ for the Lagrangian relaxation, and an initial value for the Lagrange multipliers $\lambda_i^0$. As mentioned above, the basic heuristic $\mathcal{H}_B$ may be called once using original costs $c_j$ to provide a feasible solution to the k-set covering problem (1-3) and the initialization values may be based on this feasible solution. In step 704, the Lagrangian Relaxation Problem (LRP) is solved with the current $\lambda_i^q$ and the solution denoted by $X^q$ and the objective value $Z_\lambda^q$. As noted above, for each column j the solution to LRP is $X_j^q = 1$ if $C_j <= 0$, and is zero otherwise. In step 706, the objective value $Z_\lambda^q$ is updated to be the greater of the current value and the previous value.

In step 708, the basic heuristic $\mathcal{H}_B$ is applied to construct a feasible solution J starting with the cover $J_0$ provided by the solution $X^q$ and adding sets or elements until the k-coverage specified by (1-3) is provided. The set J may be improved upon in the basic heuristic $\mathcal{H}_B$ by using the local search heuristic LS, as previously mentioned. The improved set J is then used in step 710 to create an updated upper bound $\overline{Z}$ using original costs $C_j$ of the sets in S.

If the updated upper bound $\overline{Z}$ is equal to the updated maximum lower bound $Z_\lambda^q$, then the solution is optimal and as shown in step 712 the SO algorithm is stopped and the method continues to step 614 in FIG. 3. Otherwise, method 700 continues to step 714, which uses the reduced cost $C_j$ and the values of upper bound $\overline{Z}$ and lower bound $Z_\lambda^q$ at the $q^{th}$ iteration to determine if the $j^{th}$ column may be priced out of the problem for all succeeding iterations. The test for this, as previously mentioned is $X_j = 0$ and $Z_\lambda^q + C_j > \overline{Z}$.

Next, in step 716, subgradients $g_i^q = (k - a_i X^q)$, i=1,2,...,m are calculated, and are arbitrarily set to zero whenever $g_i^q > 0$ and $\lambda_i^q = 0$ for i=1,...,m. In step 718, if it is determined that all the subgradients are zero, the method 700 is stopped and the existing solution is sent_to step 614 of FIG. 3. In step 720 another stopping test is administered, to determine if a maximum number of iterations or a maximum amount of computation time has been reached. If so, the method 700 is stopped and the existing solution is delivered to step 614 of FIG. 3. If the stopping test is not satisfied, then the method 700 proceeds to step 724.

In step 724 an updated step size $T^q$ is calculated using the updated values for upper bound $\overline{Z}$, lower bound $Z_\lambda^q$ and subgradients $g_i^q$. Then, in step 726 the Lagrange multipliers are updated, using the calculated step size $T^q$ and subgradients $g_i^q$ of steps 716 and 724, together with the formula given above, $\lambda_i^{q+1} = \max\{0; \lambda_i^q - T^q g_i^q\}$, i=1,...,m. Using path 728, the updated multipliers are returned to step 704 to provide new values for LRP. The method 700 repeats itself until one of the stopping conditions is reached, e.g., the method has repeated for a number of iterations determined to be sufficient to find a solution that is sufficiently close to optimal.

The Lagrangian solution described with reference to FIGS. 3 and 4 makes use of a basic heuristic $\mathcal{H}_B$. We now describe two variants of $\mathcal{H}_B$. The first is a variation on the basic heuristic described by Beasley (J. E. BEASLEY, *A Lagrangian Heuristic For Set-Covering Problems*, Naval Research Logistics, 37(1):151-164, 1990) that generates feasible solutions. The second is the GRASP with path-relinking described above with respect to FIGS. 2-2C.

III. Lagrangian Relaxation with Greedy Basic Heuristic

Figure 5:
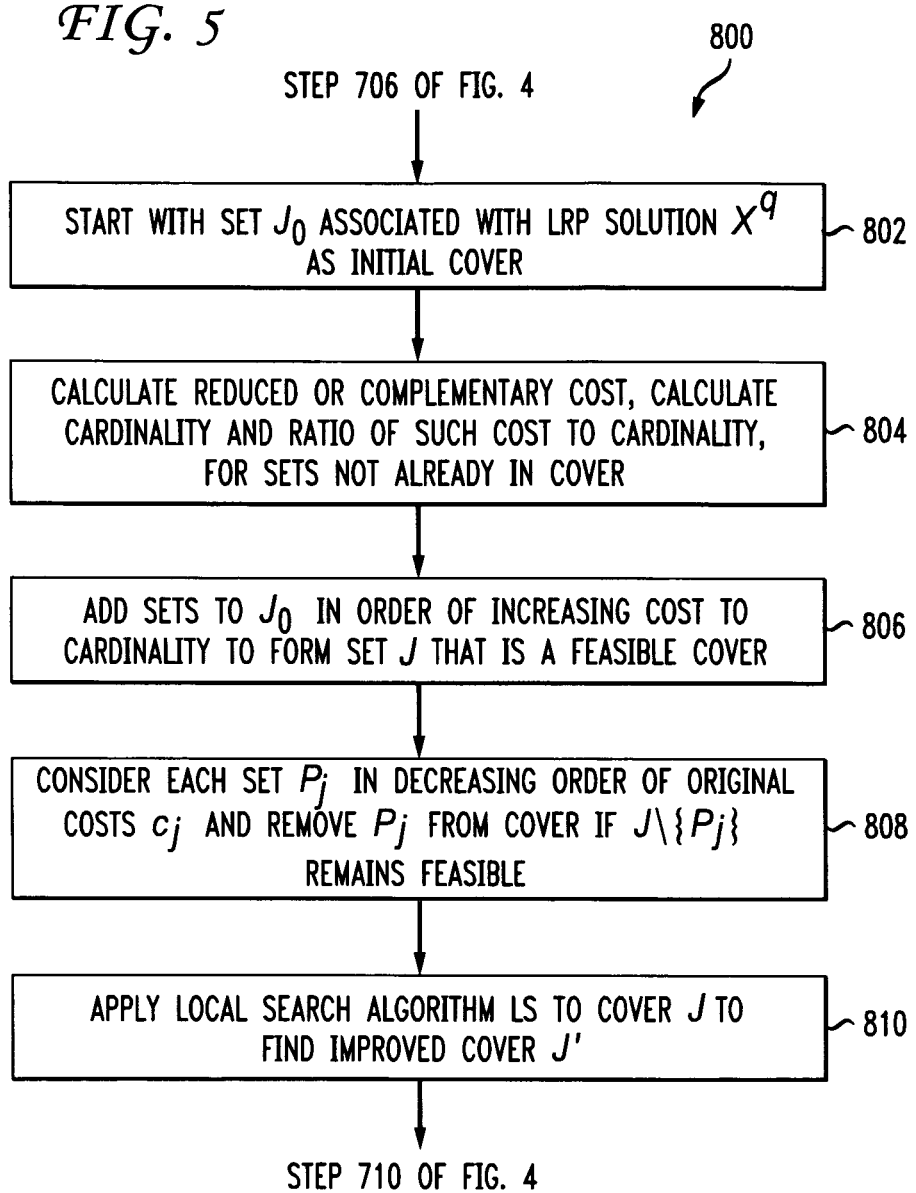
FIG. 5 is a flowchart showing a first network design methodology according to the invention used in conjunction with the subgradient optimization algorithm of FIG. 4.

The greedy basic heuristic $\mathcal{H}_{GB}$ is shown as method 800 in FIG. 5 and is used to build the feasible cover J at step 708 of method 700 in FIG. 4. As shown in FIG. 5 method 800 starts at step 802 with the tentative solution $J_0$ associated with the solution $X^q$ of the Lagrangian relaxed problem, i.e. $J \leftarrow J_0$.

Sets are added to J, one at a time, in increasing order of the ratios of cost to cardinality, until J becomes a feasible cover. As noted above, reduced costs $$C_j = c_j - \sum_{i=1}^{m} \lambda_i^q a_{ij}$$

or complementary costs given by $C_j^c = (1 - X_j^q) \cdot c_j$, for $j = 1, \ldots, n$, are used to calculate the ratios of cost to cardinality. Thus in step 804, reduced costs or complementary costs are calculated, together with cardinality, and the ratio of cost to cardinality is calculated for each set not already in the cover. In step 806, sets are added to J one at a time in increasing order of cost to cardinality until J becomes a feasible cover.

Then, in step 808, each set $P_j \in J$ is considered in decreasing order of the original costs $c_j$. $P_j$ is removed from the cover if the resulting solution $J \setminus \{P_j\}$ remains a feasible cover. As previously mentioned, the set J may be improved upon by using the local search heuristic LS, and thus in step 810 the local search heuristic LS is applied to the set J and the improved set J' then is used in step 710 of FIG. 4 to update upper bound Z.

Note that the first part of this basic heuristic $\mathcal{H}_{GB}$ is a non-randomized version of the GRASP construction RGC described above with reference to FIG. 2A, while the second part is the (1, 0)-exchange GRASP local search LS in which redundant sets are removed from the solution, described above with respect to FIG. 2B. We refer to the Lagrangian heuristic that uses the greedy basic heuristic $\mathcal{H}_{GB}$ as the Greedy Lagrangian Heuristic (GLH).

As noted above with respect to step 702 in FIG. 4, before initializing SO, $\mathcal{H}_B$ is called once using the original cost vector $c_j$. GLH may be used in step 702 to produce an initial feasible solution and corresponding upper bound to provide values for initializing the SO algorithm.

IV. Lagrangian Relaxation with GRASP Basic Heuristic

Figure 6:
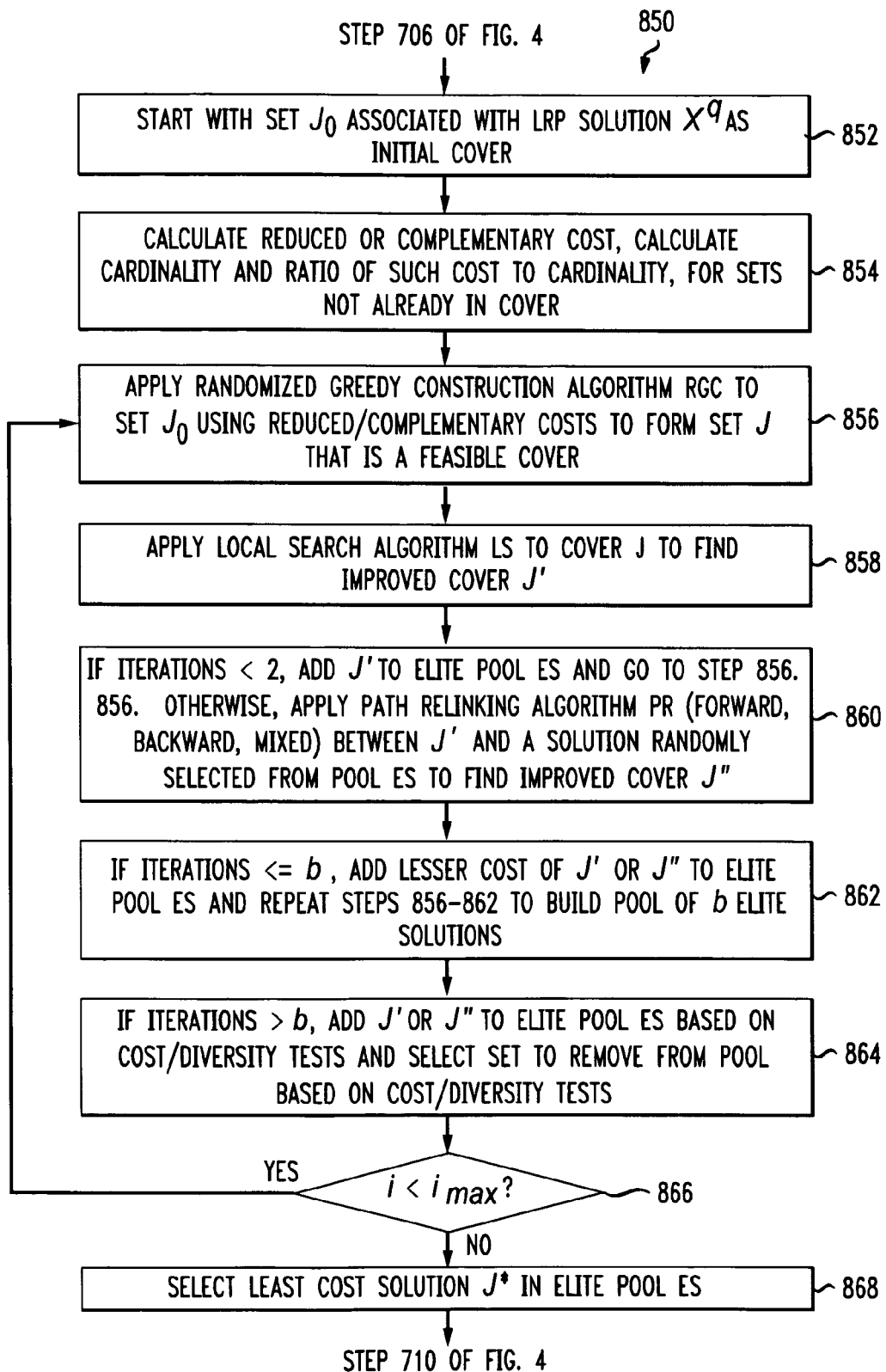
FIG. 6 is a flowchart showing a second network design methodology according to the invention used in conjunction with the subgradient optimization algorithm of FIG. 4.

Another variant of $\mathcal{H}_B$ is shown in FIG. 6. This GRASP basic heuristic $\mathcal{H}_{GRASP}$ is shown as method 850 in FIG. 5 and is used to build the feasible cover J at step 708 of method 700 in FIG. 4. $\mathcal{H}_{GRASP}$ is a slightly modified version of the GRASP with path-relinking heuristics as described above with reference to FIGS. 2-2C. In the heuristic $\mathcal{H}_{GRASP}$, , a number of iterations $i_{max}$ of GRASP with path-relinking are carried out at each iteration of SO. In the greedy randomized construction phase, instead of building a solution from scratch, the construction procedure is given the tentative solution $J_0$ associated with the solution $X^q$ of the Lagrangian relaxed problem. In the construction phase, Lagrangian reduced costs $$C_j = c_j - \sum_{i=1}^{m} \lambda_i^q a_{ij}$$

are used in calculating cost to cardinality ratios, while original costs $c_j$ are used in the local search and path-relinking phases. Before initializing the Lagrangian heuristic, the path-relinking pool ES is empty. At each iteration of SO, the solution produced by the GRASP construction and local search is considered for admission into the pool ES of elite solutions. Furthermore, a solution is randomly selected from the pool and mixed path-relinking is applied between it and the GRASP solution. The resulting cover is also a candidate for admission into the pool. At the end of the selected number of GRASP iterations in each iteration of SO, the lowest cost solution J* is used to update the upper bound Z in step 710 of FIG. 4.

Referring to FIG. 6, the method starts to build the feasible cover J in step 852 with the tentative solution $J_0$ associated with the solution $X^q$ of the Lagrangian relaxed problem, i.e. $J \leftarrow J_0$. In step 854 reduced costs or complementary costs are calculated, together with cardinality, and the ratio of cost to cardinality is calculated for each set not already in the cover. In step 856, using a randomized greedy constructive algorithm RGC as disclosed with reference to FIG. 2A, but starting with $J_0$, and using reduced costs rather than actual costs to calculate cost to cardinality ratios, a restricted candidate list RCL is constructed and sets are randomly selected from RCL and added to J one at a time until J becomes a feasible cover.

In step 858 a local search algorithm, such as local search algorithm LS disclosed in FIG. 2B, is applied to J to find an improved cover J'. In step 860, if the number of iterations of SO is <2, J' is added to an elite pool ES of b candidate solutions, which is empty at initialization of the SO heuristic 700 in FIG. 4. In step 860, if the number of iterations of SO is >=2, then a path relinking algorithm, such as the path relinking algorithm PR disclosed in FIG. 2C, is applied between J' and a solution randomly selected from pool ES to find an improved cover J". As described with reference to FIG. 2C, path-relinking may be applied in a forward, backward or mixed direction, with mixed path-relinking being preferred. In step 862, if the number of iterations is <=b, then J' or J" is added to the elite set ES. In step 864, if the number of iterations >b, then J' or J" is added to the elite set ES based on cost and diversity tests as described above with respect to FIG. 2C. Similarly, the set to be removed from set ES is selected based on cost and diversity tests described above with respect to FIG. 2C. In step 866, if the number of iterations of GRASP with path-relinking are determined to be less than $i_{max}$, then the method 850 returns to step 856 to repeat steps 856 through 864. If $i = i_{max}$, in step 868 the lowest cost solution J* in the elite set ES is chosen, and is used in step 710 of FIG. 4 to update upper bound Z.

At the initializing step 702 in FIG. 4, the $\mathcal{H}_{GRASP}$ heuristic can be applied once, starting with a randomly selected set and using original costs $c_j$, to build a feasible initial cover to be used for setting initial values.

We refer to the Lagrangian heuristic that uses the GRASP basic heuristic $\mathcal{H}_{GRASP}$ as the GRASP Lagrangian heuristic or simply LAGRASP.

Figure 7:
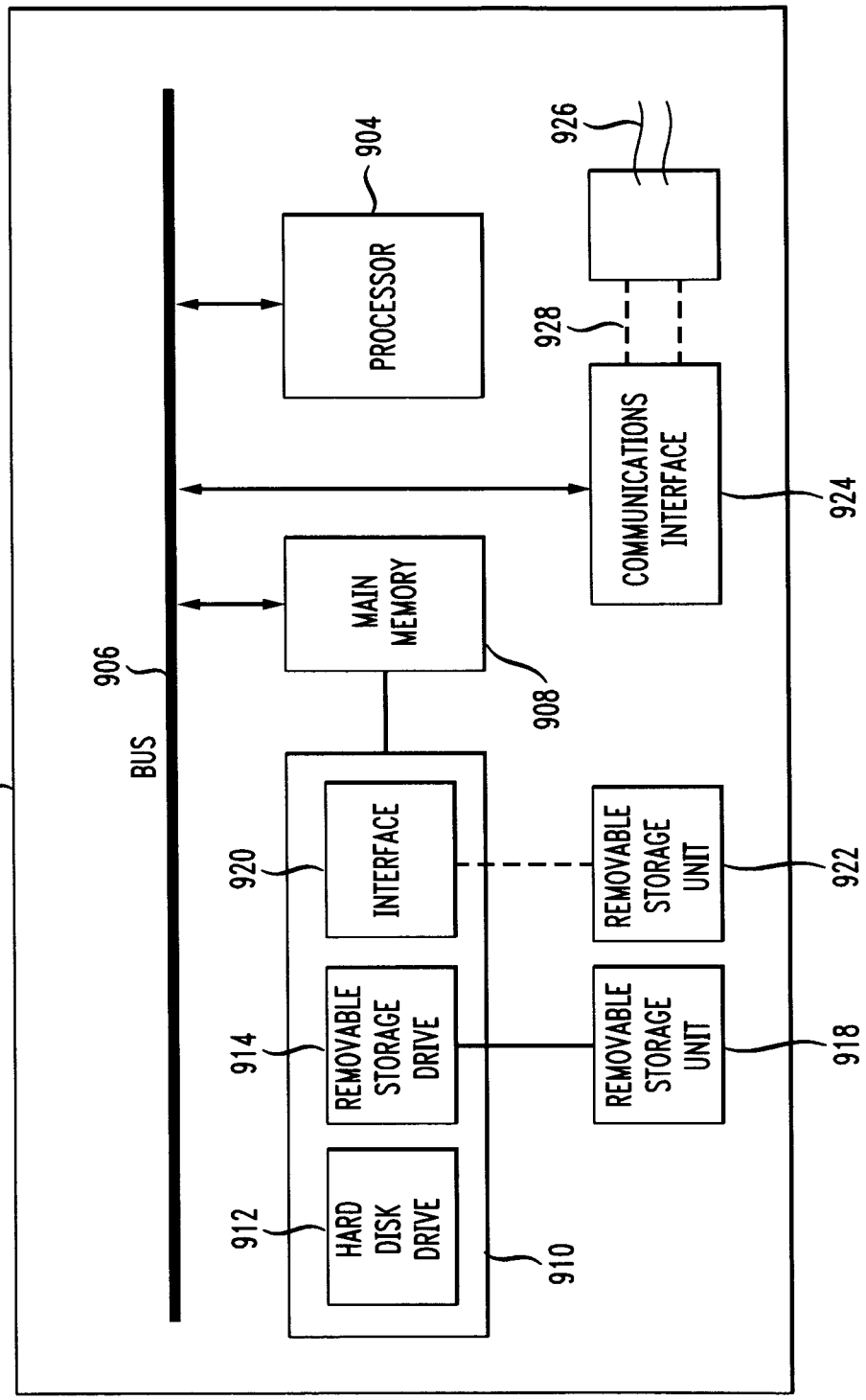
FIG. 7 is block diagram showing illustrative computer hardware and software architecture for a computing system capable of implementing aspects of the invention.

FIG. 7 is a block diagram illustrating a computer system 900 configured to utilize iterative rounding to find an approximate solution to the network design methodologies modeled on the k-set cover problem, in accordance with the exemplary embodiments described above. Such a computer system 900 may be utilized to implement the methods described above in regard to FIGS. 2, 2A-C, and 3-6. Thus the present invention, in another aspect, includes one or more computer systems capable of carrying out the methods of the invention; in a further aspect, the present invention is directed to a computer-usable program code storage medium to cause a computer to perform the methods of the invention. After reading this description, it will become apparent to a person skilled in the relevant art how to implement the invention using other computer systems and/or computer architectures.

The computer system 900 shown in FIG. 7 includes one or more processors, such as processor 904. The processor 904 is connected to a communication bus 906. Computer system 900 also includes a main memory 908, preferably random access memory (RAM), and can also include a secondary memory 910. The secondary memory 910 can include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918 represents a floppy disk, magnetic tape, optical disk, or similar device which is read by and written to by removable storage drive 914. As will be appreciated, the removable storage unit 918 includes a computer usable storage medium for storing computer software and/or data.

In alternative embodiments, secondary memory 910 may include other similar means for allowing computer programs or other instructions to be loaded into computer system 900. Such means can include, for example, a removable storage unit 922 and an interface 920. Examples of such include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 918 to computer system 900.

Computer system 900 can also include a communications interface 924. Communications interface 924 allows software and data to be transferred between computer system 900 and external devices, such as an ISP network. Examples of communications interface 924 can include a modem, a network interface (such as an Ethernet card), a communications port, a PCMCIA slot and card, etc. Software and data transferred via communications interface 924 are in the form of signals which can be electronic, electromagnetic, optical or other signals capable of being received by communications interface 924. These signals 926 are provided to communications interface 924 via a channel 928. This channel 928 carries signals 926 and can be implemented using wire or cable, fiber optics, a phone line, a cellular phone link, an RF link and other communications channels.

In this specification, the terms "computer program medium" and "computer usable medium" are used to generally refer to media such as removable storage device 918, a hard disk installed in hard disk drive 912, and signals 926. These computer program products are means for providing software to computer system 900.

Computer programs (also called computer control logic) are stored in main memory 908 and/or secondary memory 910. Computer programs can also be received via communications interface 924. Such computer programs, when executed, enable the computer system 900 to perform the features of the methods shown in FIGS. 2-6 of the present invention as discussed herein. In particular, the computer programs, when executed, enable the processor 904 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912 or communications interface 924. The control logic (software), when executed by the processor 904, causes the processor 904 to perform the methods of the invention as described above.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). It will be apparent that the invention may be implemented using a combination of both hardware and software.

EXAMPLES

The quality and running times of solutions obtained using the three heuristics were compared against a benchmark provided by the commercial integer programming solver CPLEX 11. Some examples are set out below.

The computer system of FIG. 7 was provided by an SGI Altix 3700 Supercluster (32 1.tGHz Itanium-2 processors and 256 Gb of shared memory) running Linux (RedHat Advanced Server with SGI ProPack). Codes were written in C and compiled. Each run described below was limited to a single processor.

Tests were run on the 45 samples provided by Beasley (J. E. BEASLEY, OR-Library: Distributing test problems by electronic mail, *Journal of the Operational Research Society*, 41:1069-1072, 1990). Each of the 45 samples was run with $$k_{min} = 2, k_{max} = \min \sum_{j=1}^{n} a_{ij}, \text{ and } k_{med} = (k_{min} + k_{max})/2,$$

for a total of 135 test instances. Each instance was run 10 times and the best results over the 10 runs are considered.

GRASP with path-relinking. In the experiments involving GRASP with path-relinking (GRASP-PR), 10 runs are carried out for each instance, varying the initial seed of the random number generator. Each run consists of 1000 iterations. The RCL parameter a is automatically adjusted according to the Reactive GRASP strategy as suggested by Prais and Ribeiro, i.e., for each value of a in a set of discrete values $\{\alpha_1, \alpha_2, \ldots, \alpha_r\}$ we associate probabilities $p_i$, i=1, . . . , r. Before starting the GRASP-PR iterations, we set $p_i$=1/r, for i= 1, . . . , r. These probabilities are periodically updated according to $$p_i = q_i \bigg/ \sum_{j=1}^{n} q_i, i = 1, \ldots, r \text{ where } q_i = \left(\frac{f^*}{M_i}\right)^{\gamma}, i = 1, \ldots, r$$

where $f^*$ is the value of the best solution found among all GRASP-PR iterations and $M_i$ is the average value of the solutions found using RCL parameter $\alpha_i$. In doing so, values of α leading to better results will have a higher probability of being selected. Furthermore, the factor γ is used to attenuate low value probabilities and intensify high value probabilities.

In this experiment, r is fixed to 20 and $\alpha_i=0.05i$, for $i=1, \ldots,$ r. The probabilities $p_i$ are updated at every 100 GRASP-PR iterations and the parameter γ is set to 100. The pool of elite solutions ES is set to have at most 100 elements.

Greedy Lagrangian heuristic. Following Beasley, the greedy Lagrangian heuristic has three stopping criteria: (a) If the lower bound $Z_\lambda^q$ matches the upper bound $\overline{Z}$, in which case $\overline{Z}$ is the optimal solution; (b) If every element of the subgradient becomes too small, i.e. if $$\sum_{i=1}^{m}(g_i^q)^2 = 0$$

then in equation (6) it would be impossible to define a suitable step size; or (c) If step size parameter δ becomes too small, i.e. if δ~0.005. Parameter δ, initially set to 2.0, is halved after 30 consecutive SO iterations without an overall improvement in the best lower bound. The greedy basic heuristic, as described above, is run at each SO iteration. The same applies to the proposed variable pricing out step.

GRASP Lagrangian heuristic. In this variant of the Lagrangian heuristic each iteration of SO runs a single iteration of GRASP with path-relinking. The first iteration, however, runs 100 GRASP-PR iterations to populate the pool of elite solutions ES for path-relinking. This pool is set to have at most 100 elements. Experimentally, we observed that the best solutions were obtained when small values of α were applied. Therefore, to avoid the overhead of updating the probabilities of the reactive GRASP, the parameter α is randomly chosen in the range [0, 0.1] at each SO iteration. The adjustment of δ and the stopping criteria are the ones used for the greedy Lagrangian heuristic. For each instance, 10 runs are carried out varying the initial seed of the random number generator.

These computations gave the following results. The commercial integer programming solver CPLEX 11 found the best value in all 135 instances at a total time of 367,721 seconds (total of average times for the 10 runs of each of the 135 instances). GRASP-PR found solutions that were only 4.91% average deviation from best, at a total time of 62,498 seconds (about 17% of the CPLEX time). GLH found 6 best solutions, with solutions that were 1.52% average deviation from best, at a total time of 2259 seconds (about 0.6% of the CPLEX time). LAGRASP found 9 best solutions, with solutions that were 0.99% average deviation from best, at a total time of 23,380 seconds (about 6% of the CPLEX time).

Thus, the invention describes a methodology enabling minimum-cost networks with k-coverage, i.e., redundant points of presence, to be designed. The invention includes system, computer program product and method aspects. While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular situation to the teachings of the invention without departing from the scope thereof. Therefore, it is intended that the invention not be limited to the particular embodiments disclosed, but that the invention include all embodiments falling within the scope of the appended claims.

What is claimed is:

1. An approximation method carried out by computer-usable program code operable by a computer system for designing a minimum cost network with k-fold redundant coverage of objects to be served by the network, by starting from a collection of potential network elements each having a defined cost value and each having a defined object coverage parameter, and by transforming the collection of potential network elements into a set of network elements that provide the required k-fold redundant coverage at approximate minimum cost, comprising:
   providing a k-set coverage formulation with the cost values and the object coverage parameter values of the collection of potential network elements;
   providing a Lagrangian relaxation formulation of the k-set coverage formulation;
   applying an iterative subgradient optimization algorithm to the Lagrangian relaxation;
   determining an initial solution found by an iteration of the subgradient optimization algorithm;
   applying a greedy construction algorithm to add selected elements to the initial solution to form a feasible solution by
      determining the cardinality of an unselected element as the number of objects not in previously selected elements that the unselected element covers,
      selecting from the remaining unselected elements based on the ratio of cost to cardinality, and
      repeating the determining and selecting steps until a feasible solution has been obtained,
   using the feasible solution to select parameters for the next iteration of the subgradient optimization algorithm,
   continuing to perform iterations until a set of network elements having an approximate minimum cost solution is identified, and
   selecting for the network design network elements which are identified in the approximate minimum cost solution from the collection of potential network elements so that the resulting network design will have the required redundancy and approximate minimum cost.

2. The method claimed in claim 1 wherein the subgradient optimization algorithm updates Lagrangian multipliers using a step size, and wherein the feasible solution is used to adjust the step size at each subgradient optimization iteration.

3. The method claimed in claim 1 further comprising:
   evaluating each element in the feasible solution constructed with the greedy construction algorithm in decreasing order of its cost to determine whether if the element is removed the resulting solution remains a feasible solution, and
   removing the element if the resulting solution remains a feasible solution.

4. The method claimed in claim 1 wherein the greedy construction algorithm selects from the remaining unselected elements the one with the lowest ratio of cost to cardinality.

5. The method claimed in claim 1 wherein the greedy construction algorithm randomly selects the next element from a portion of the remaining unselected elements with the lowest cost to cardinality ratios to find a feasible solution, and further comprising:
   applying a local search algorithm to the feasible solution found by the greedy construction algorithm to obtain a first least cost feasible solution,
   forming a pool of elite feasible solutions,
   applying a path-relinking algorithm between the first feasible solution and a second feasible solution selected from the pool of elite feasible solutions,
   adding the solution found by path-relinking to the elite pool of feasible solutions if it satisfies predetermined cost and diversity tests, and selecting the least cost feasible solution in the elite pool as the one used to select parameters for the next iteration of the subgradient optimization algorithm.

6. A computer system operable with computer-usable program code for designing a minimum cost network with k-fold redundant coverage of objects to be served by the network, by starting from a collection of potential network elements each having a defined cost value and each having a defined coverage parameter, and by transforming these potential network elements into a set of network elements that provides the required k-fold redundant coverage at approximate minimum cost, comprising:

means for providing a k-set coverage formulation with the cost values and the object coverage parameter values of the collection of potential network elements;

means for providing a Lagrangian relaxation of the k-set coverage formulation;

means for applying an iterative subgradient optimization algorithm to the Lagrangian relaxation;

means for determining an initial solution found by an iteration of the subgradient optimization algorithm;

means for applying a greedy construction algorithm to add selected elements to the initial solution to form a feasible solution by determining the cardinality of an unselected element as the number of objects not in previously selected elements that the unselected element covers, selecting from the remaining unselected elements based on the ratio of cost to cardinality, and repeating the determining and selecting steps until a feasible solution has been obtained, means for using the feasible solution to select parameters for the next iteration of the subgradient optimization algorithm, and means for continuing to perform iterations until a set of network elements having an approximate minimum cost solution is identified, whereby the network elements which are identified in the approximate minimum cost solution from the collection of potential network elements will produce a network design with the required redundancy and approximate minimum cost.

7. The system claimed in claim 6 wherein the subgradient optimization algorithm updates Lagrangian multipliers using a step size, and wherein the feasible solution is used to adjust the step size at each subgradient optimization iteration.

8. The system claimed in claim 6 further comprising:
means for evaluating each element in the feasible solution constructed with the greedy construction algorithm in decreasing order of its cost to determine whether if the element is removed the resulting solution remains a feasible solution, and means for removing the element if the resulting solution remains a feasible solution.

9. The system claimed in claim 6 wherein the means for applying the greedy construction algorithm selects from the remaining unselected elements the one with the lowest ratio of cost to cardinality.

10. The system claimed in claim 6 wherein the means for applying the greedy construction algorithm randomly selects the next element from a portion of the remaining unselected elements with the lowest cost to cardinality ratios to find a feasible solution, and further comprising:

means for applying a local search algorithm to the feasible solution found by the greedy construction algorithm to obtain a first least cost feasible solution, means for forming a pool of elite feasible solutions, means for applying a path-relinking algorithm between the first feasible solution and a second feasible solution selected from the pool of elite feasible solutions, means for adding the solution found by path-relinking to the elite pool of feasible solutions if it satisfies predetermined cost and diversity tests, and means for selecting the least cost feasible solution in the elite pool as the one used to select parameters for the next iteration of the subgradient optimization algorithm.

11. The method claimed in claim 1 wherein the network is a cellular communications network, the objects served by the network are cellular telephone customers, the potential network elements are cellular antennas, the defined cost value is the associated cost of a potential cellular antenna, the defined object coverage parameter is the associated cellular customer coverage of a potential cellular antenna, the k-fold redundant coverage of objects is a desired multiple coverage of cellular customers by cellular antennas to be provided in the designed network, and the approximate minimum cost network design is a cellular antenna network with required redundant coverage and approximate minimum cost.

12. The method claimed in claim 1 wherein the network is a network of modem locations for telephone ISP access, the potential network elements are modems, the objects served by the network are ISP customers who access the modems with telephones, the defined cost value is the associated cost of a modem, the defined object coverage parameter is the associated ISP customer coverage of a potential modem, the k-fold redundant coverage of objects is desired multiple coverage of ISP customers by modems to be provided in the designed network, and the approximate minimum cost network design is a modem network with required redundant coverage and approximate minimum cost.

13. The method claimed in claim 1 wherein the network is a network of DSL hubs for Internet access, the potential network elements are DSL hubs, the objects served by the network are customer who access the Internet through DSL hubs, the defined cost value is the associated cost of a potential DSL hub, the defined object coverage parameter is the associated transmission range of a potential DSL hub, the k-fold redundant coverage of objects is desired multiple coverage of customers by DSL hubs to be provided in the designed network, and the approximate minimum cost network design is a DSL hub network with required redundant coverage and approximate minimum cost.

14. The system claimed in claim 6 wherein the network is a cellular communications network, the objects served by the network are cellular telephone customers, the potential network elements are cellular antennas, the defined cost value is the associated cost of a potential cellular antenna, the defined object coverage parameter is the associated cellular customer coverage of a potential cellular antenna, the k-fold redundant coverage of objects is a desired multiple coverage of cellular customers by cellular antennas to be provided in the designed network, and the approximate minimum cost network design is a cellular antenna network with required redundant coverage and approximate minimum cost.

15. The system claimed in claim 6 wherein the network is a network of modem locations for telephone ISP access, the potential network elements are modems, the objects served by the network are ISP customers who access the modems with telephones, the defined cost value is the associated cost of a modem, the defined object coverage parameter is the associated ISP customer coverage of a potential modem, the k-fold redundant coverage of objects is desired multiple coverage of ISP customers by modems to be provided in the designed network, and the approximate minimum cost network design is a modem network with required redundant coverage and approximate minimum cost.

16. The system claimed in claim 6 wherein the network is a network of DSL hubs for Internet access, the potential network elements are DSL hubs, the objects served by the network are customer who access the Internet through DSL hubs, the defined cost value is the associated cost of a potential DSL hub, the defined object coverage parameter is the associated transmission range of a potential DSL hub, the k-fold redundant coverage of objects is desired multiple coverage of customers by DSL hubs to be provided in the designed network, and the approximate minimum cost network design is a DSL hub network with required redundant coverage and approximate minimum cost.

* * * * *